US008718885B2

(12) United States Patent
Ueno et al.

(10) Patent No.: US 8,718,885 B2
(45) Date of Patent: May 6, 2014

(54) SHIFT CONTROL DEVICE FOR VEHICLE

(75) Inventors: Koki Ueno, Toyota (JP); Takahiko Tsutsumi, Toyota (JP); Takashi Yuma, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/257,987

(22) PCT Filed: Mar. 8, 2010

(86) PCT No.: PCT/JP2010/054275
§ 371 (c)(1),
(2), (4) Date: Sep. 21, 2011

(87) PCT Pub. No.: WO2010/110097
PCT Pub. Date: Sep. 30, 2010

(65) Prior Publication Data
US 2012/0010793 A1   Jan. 12, 2012

(30) Foreign Application Priority Data

Mar. 26, 2009  (JP) ................................. 2009-077497

(51) Int. Cl.
*G06F 7/00* (2006.01)
(52) U.S. Cl.
USPC ......................................................... 701/58
(58) Field of Classification Search
USPC ........................................................... 701/58
See application file for complete search history.

(56) References Cited

U.S. PATENT DOCUMENTS

| 5,421,416 | A  | * | 6/1995 | Orbach et al. ..................... 172/4 |
| 6,118,692 | A  | * | 9/2000 | Banks ....................... 365/185.03 |
| 7,572,203 | B2 | * | 8/2009 | Kashiwagi et al. ............. 477/34 |
| 8,175,778 | B2 | * | 5/2012 | Kitaori ............................ 701/52 |
| 8,265,841 | B2 | * | 9/2012 | Kamada ......................... 701/62 |

(Continued)

FOREIGN PATENT DOCUMENTS

| CN | 1768223      | 5/2006  |
| DE | 10 2006 026 216 | 12/2006 |

(Continued)

OTHER PUBLICATIONS

International Search Report in International Application No. PCT/JP2010/054275; Mailing Date: Jun. 30, 2010.
Written Opinion of the International Searching Authority in International Application No. PCT/JP2010/054275; Mailing Date: Jun. 30, 2010.

*Primary Examiner* — Thomas Tarcza
*Assistant Examiner* — Alex C Dunn
(74) *Attorney, Agent, or Firm* — Finnegan, Henderson, Farabow, Garrett & Dunner, LLP

(57) ABSTRACT

A shift control device for vehicle is provided capable of controlling an actuator to switch shift ranges of a transmission and switching establishment of operating states between a first operating state enabling a detection of a reference position for controlling the actuator during an initial operation of the actuator, and a second operating state disabling the detection of the reference position, besides the first and second operating states, a third operating state being able to be established with an inability to detect the reference position but with an ability to detect vehicle information; and when the second operating state is switched to the first operating state with the third operating state continuously remained, after switching from the first operating state to the second operating state, the reference position being detected again.

16 Claims, 9 Drawing Sheets

(56) References Cited

U.S. PATENT DOCUMENTS

| | | |
|---|---|---|
| 2005/0126322 A1* | 6/2005 | Kozaki et al. .................... 74/335 |
| 2006/0207373 A1 | 9/2006 | Amamiya et al. |
| 2006/0276300 A1 | 12/2006 | Kashiwagi et al. |
| 2008/0039279 A1* | 2/2008 | Soga et al. ...................... 477/45 |
| 2008/0168853 A1 | 7/2008 | Amamiya et al. |
| 2008/0210033 A1 | 9/2008 | Amamiya et al. |

FOREIGN PATENT DOCUMENTS

| | | |
|---|---|---|
| JP | 2002-323127 | 11/2002 |
| JP | 2004-308752 | 11/2004 |
| JP | 2006-087175 | 3/2006 |
| JP | 2006-336840 | 12/2006 |

* cited by examiner

SHIFT POSITION (LATERAL DIRECTION)

| SHIFT POSITION | POSITION "N" | POSITION "R" | POSITION "D" | POSITION "M" | POSITION "B" |
|---|---|---|---|---|---|
| DETECTION SIGNAL VOLTAGE V$_{SF}$ OF SHIFT SENSOR | mid | high | low | mid | low |
| DETECTION SIGNAL VOLTAGE V$_{SL}$ OF SELECT SENSOR | high | high | high | low | low |

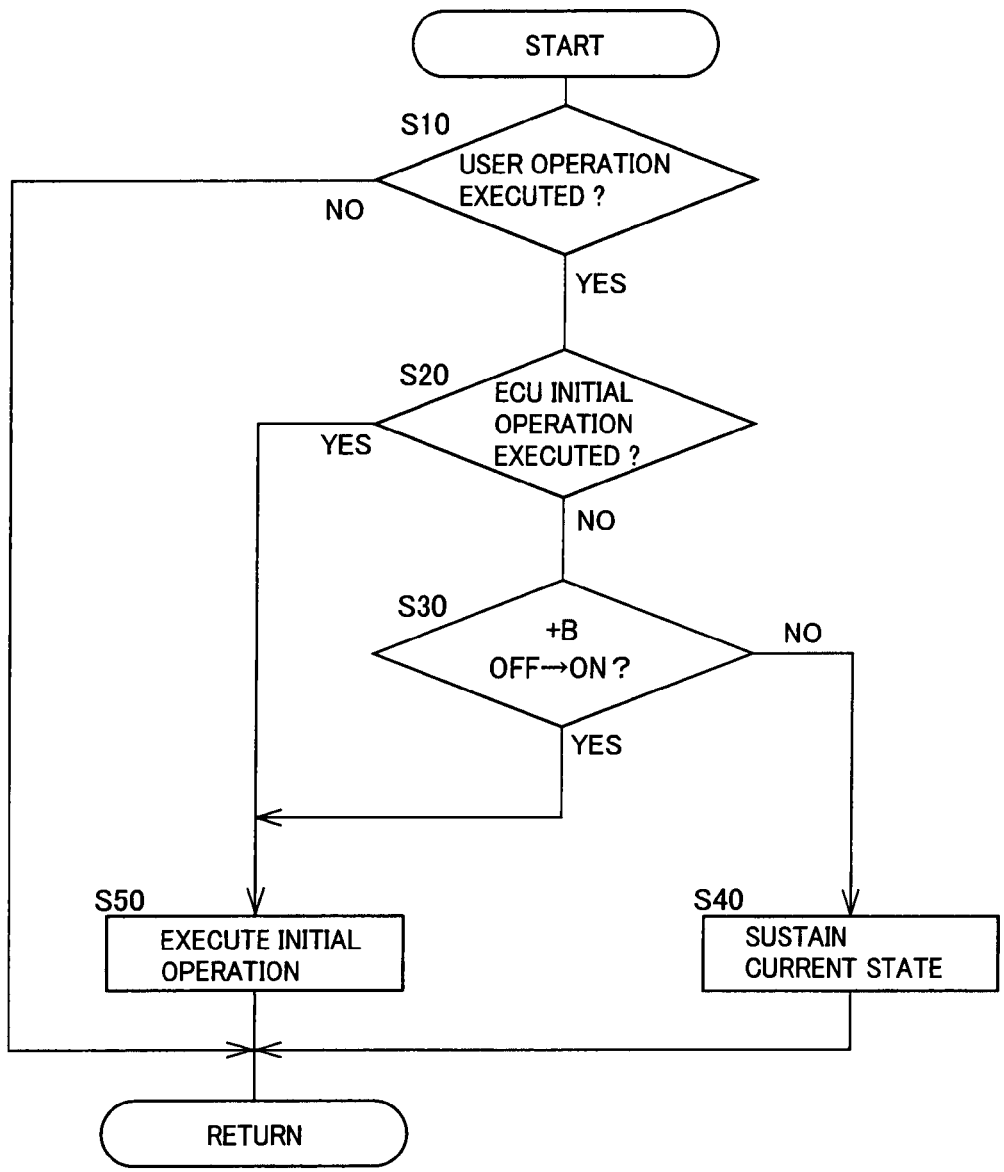

SHIFT CONTROL DEVICE FOR VEHICLE

CROSS-REFERENCE TO RELATED APPLICATIONS

This application is a national phase application of International Application No. PCT/JP2010/054275, filed Mar. 8, 2010, and claims the priority of Japanese Application No. 2009-077497, filed Mar. 26, 2009, the contents of both of which are incorporated herein by reference.

FIELD OF THE INVENTION

The present invention relates to a shift control device for vehicle for switching shift ranges of a transmission via an actuator.

DESCRIPTION OF THE RELATED ART

A shift control device for vehicle has heretofore been known in which a transmission has shift ranges that can be switched via an actuator in response to, for instance, an operation executed by a driver. For instance, Patent Publication 1 (JP 2004-308752 A) discloses such a shift control system that includes a shift control device employing a so-called shifting-by-wire (SBW) configured to switch the shift range under electrical control. The shift control system includes an electric motor as the actuator for switching the shift range between a parking range (P range) and the rest of a non-parking range (non-P range). In operating the electric motor, an initial drive control is executed including excitation-matching of the electric motor each time the electric power supply is turned on so that an absolute position of the electric motor is grasped even when using an output of an encoder, in the form of a relative rotational position sensor, as a positional information of the electric motor.

Subsequently, the electric motor is rotated toward a restraining member that restrains the electric motor from rotating in a predetermined direction at a predetermined position associated with the shift range, upon which a reference position of the encoder is detected. This can appropriately control the electric motor in rotation such that the switching control of the shift range can be properly performed.

DISCLOSURE OF THE INVENTION

Meanwhile, there is a case where in order to activate a function like a functional check, etc., of a vehicle during a halt thereof even when the vehicle power supply remains under a turn-off state (with the vehicle power supply remained turned off), a relevant electronic control device (ECU) is placed in an operating state. Under such an operating state, it is considered that a wake state is established in which for instance the initial drive control of the electric motor and the function of detecting the reference position described above are interrupted due to the vehicle power supply being turned off, and only the function such as the functional check, etc., for the halt of the vehicle is activated. When the vehicle power supply is switched from for instance the turn-off state to a turn-on state (vehicle power supply turned on) to switch the ECU from a halt state to a running state, the initial drive control and the reference-position detecting function of the electric motor are executed.

Meanwhile, an another mode is considered wherein the ECU remained under for instance the wake state during the vehicle power supply being turned off is switched to the running state due to switching of the vehicle power supply from the turn-off state to the turn-on state. In such a mode, no initial operation (initial processing) is executed for the ECU, and hence, none of the initial drive control and the reference-position detecting function of the electric motor is executed. Then, none of the initial drive control and the reference-position detecting function is executed despite a situation under which data due to execution of the initial drive control and the reference-position detecting function is reset to an initial state by turn-off of the vehicle power supply. This results in likelihood that, for instance, since the electric motor is not properly controlled in rotation no shift range can be suitably switched. Meanwhile, such an issue described above is unknown in the art.

The present invention has been completed with the above view in mind, and has an object to provide a shift control device for vehicle that can reliably detect a reference position for controlling an actuator to appropriately switch a shift range of a transmission via the actuator.

For achieving an above object, a first aspect of the present invention provides a shift control device for vehicle capable of controlling an actuator to switch shift ranges of a transmission and switching establishment of operating states between a first operating state enabling a detection of a reference position for controlling the actuator during an initial operation of the actuator, and a second operating state disabling the detection of the reference position. The control device is characterized in that, besides the first and second operating states, a third operating state can be established with an inability to detect the reference position but with an ability to detect vehicle information, and when the second operating state is switched to the first operating state with the third operating state continuously remained, after switching from the first operating state to the second operating state, the reference position is detected again.

With the first aspect, after the first operating state enabling a detection of a reference position for controlling the actuator during an initial operation of the actuator is switched to the second operating state disabling the detection of the reference position, when the second operating state is switched to the first operating state with the third operating state being continuously remained with an inability to detect the reference position but with an ability to detect vehicle information, the reference position is detected again. Accordingly, the reference position for controlling the actuator can be appropriately detected, thereby properly switching the shift range of the transmission via the actuator.

Preferably, when the second operating state is switched to the first operating state, the first operating state is established after establishment of the third operating state. With such an operation, the reference position can be appropriately detected under the first operating state for controlling the actuator. For instance, after the initial operation is appropriately executed under the third operating state, the first operating state is established. In addition, the reference position may be detected by phase-matching between for instance a rotor and a stator of the actuator. This enables the actuator to be electrified at a correct excitation phase even if excitation phases are deviated under the second operating state.

More preferably, establishment of the second operating state corresponds to a turn-off of a vehicle power supply, and establishment of the first operating state corresponds to a turn-on of the vehicle power supply. With such an operation, when the vehicle power supply is switched from the turn-off state to the turn-on state, the reference position, once reset to for instance the initial state, can be detected again during the initial operation of the actuator.

More preferably, a parking range and a non-parking range of the transmission for switchably activating and canceling a parking lock in response to a driver operation are switched under electrical control by actuating the actuator; under the third operating state, an antitheft function is activated disabling the transmission from being switched to the non-parking range for switchably canceling the parking lock in response to the driver operation; and the third operating state can be established in spite of a state of the vehicle power supply. With such a control, when the second operating state is switched to the first operating state with the antitheft function remained activated, the reference position for controlling the actuator can be appropriately detected at the initial operation of the actuator.

More preferably, a count value depending on a displacement of the actuator is acquired, and the actuator is controlled such that the acquired count value matches a preset target count value, the actuator can be restricted from moving in a predetermined direction under a predetermined shift range; and under the first operating state, when the actuator is moved in the direction where movement of the actuator is restricted, the reference position of the actuator associated with the predetermined shift range is detected based on the acquired count value. With such an operation, the reference position for controlling the actuator can be appropriately detected.

More preferably, further, the transmission may have structures of either one of structures described below. Firstly, the transmission may be a variety of planetary-gear type multi-step transmissions with for instance a forward drive four-speed gear positions, a forward drive five-speed gear positions, a forward drive six-speed gear positions and more gear positions. In these transmissions, rotary elements of plural sets of planetary gear devices are selectively coupled by engagement devices such that a plurality of gear positions (shift positions) is alternately established. The transmission may further be a synchronous mesh-type parallel two-shaft transmission including plural pairs of constant-mesh type change gears mounted on two shafts, in which either one of the plural pairs of change gears is alternately brought into a power transmitting state by the action of a synchronous device. The synchronous mesh-type parallel two-shaft transmission may include a hydraulic actuator to drive the synchronous device such that gear positions are automatically switched. The transmission may further include a so-called belt-drive type continuously variable transmission having a power transmitting belt serving as a power transmitting member, which is wound in tension between a pair of variable pulleys having variable effective diameters to vary speed ratios in a continuously variable fashion.

Secondly, the transmission may be a so-called traction type continuously variable transmission having a pair of cones arranged to rotate about a common axis, and plural pieces of rollers operative to rotate about a center of rotation intersecting the common axis. The rollers are pinched between the pair of cones, and an intersecting angle between the center of rotation of the rollers and the common axis is varied to vary the speed ratios.

Thirdly, the transmission may be an automatic transmission including a differential mechanism structured of for instance a planetary gear unit arranged to distribute a drive power from an engine to a first electric motor and an output shaft, a second electric motor mounted on the differential mechanism at an output shaft thereof. With such an automatic transmission, the differential mechanism has a differential action which mechanically transmits a main part of the drive power of the engine to drive wheels. The rest of the drive power from the engine is electrically transmitted through the first electric motor to a second electric motor in an electrical path, thereby electrically varying the speed ratios. In another alternative, the transmission may be an automatic transmission including an electric motor capable of transmitting a drive power to an engine shaft and an output shaft, which is installed on a so-called parallel shaft type hybrid vehicle.

More preferably, the drive force source of the vehicle may include engines widely in use such as internal combustion engines like a gasoline engine and a diesel engine, etc. As the auxiliary power force source, an electric motor can be added to the engine. Alternatively, as the power force source for running, only the electric motor can be used.

BRIEF DESCRIPTION OF THE DRAWINGS

FIG. 9 is a state transition diagram illustrating a series of initial controls to be executed in a parking lock device with a vehicle power supply being turned on.

FIG. 14 is a flowchart illustrating a major part of control operations to be executed in the electronic control section, i.e., the control operations of reliably determining a reference position for a P-lock drive motor to be controlled and appropriately switching a transmission between a P range and a non-P range via the P-lock drive motor.

DETAILED DESCRIPTION OF THE PREFERRED EMBODIMENTS

Now, an embodiment according to the present invention will be described below in detail with reference to the accompanying drawings.

Embodiment

Figure 1:
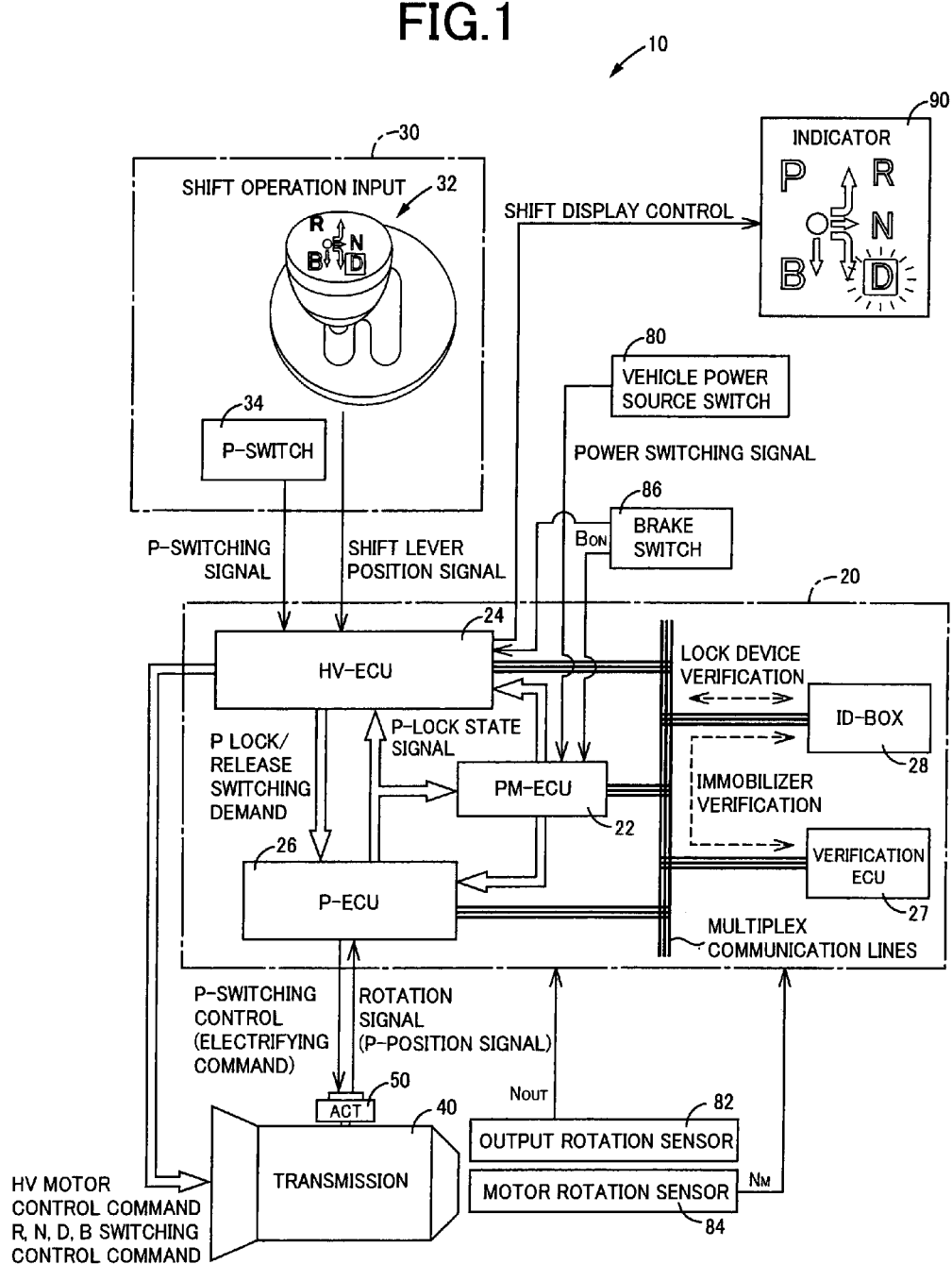
FIG. 1 is a view illustrating an outline structure of a shifting control device for vehicle to which the present invention is applied.

FIG. 1 is a view illustrating an outline structure of a shifting control device for vehicle (hereinafter referred to as a "shifting control device") 10 to which the present invention is applied. The shifting control device 10 includes an electronic control section 20, a shift operation device 30, a transmission 40 and a parking lock device 50, etc., and functions as a shifting control device of a shift-by-wire system to switch shifting positions (shift positions or shift ranges) of the transmission 40 by electric control. Hereunder, description will be provided of an exemplary case with the shifting control device 10 of the present invention applied to the transmission 40 preferably used for a hybrid vehicle including a drive-force source comprised of an engine and an electric motor. However, the vehicle, to which the shifting control device 10 of the present invention is applied, may be vehicles of various types such as a usual engine-propelled vehicle, a hybrid vehicle and an electric vehicle, etc.

The electronic control section 20 has a structure including a so-called microcomputer comprised of a CPU, a ROM, a RAM and input and output interfaces, etc. Signal processing executed in accordance with programs preliminarily stored in the ROM with utilizing a temporarily storing function of the RAM executes a drive control such as a hybrid drive control or the like related to the engine (not shown) and the electric motor incorporated in the transmission 40, and a switching control for switching shift ranges in the transmission 40 by using the shift-by-wire system.

The electronic control section 20 is applied with various signals including: positional signals delivered from a shift sensor 36 and a select sensor (see FIG. 2) 38, acting as position sensors for detecting an operated position (shift position) $P_{SH}$ of for instance a shift lever 32, depending on the shift position $P_{SH}$ of the shift lever 32; a P-switching signal representing a switching operation of a P-switch 34 operable by a user for switching the shift range of the transmission 40 between a parking range (P-range) and non-P-ranges except the P-range; and a P-position signal representing an operating state of a parking lock in the parking lock device 50, actuated when the parking lock is operated or released, for switching the shift range of the transmission 40 between the P-range and the non-P-ranges.

The electronic control section 20 is further applied with other signals including: a power switching signal representing a switching operation of a vehicle power source switch 80 operable by the user for switching a vehicle power source in a turn-on state (vehicle power source TURN-ON) and a turn-off state (vehicle power source TURN-OFF); an output rotation speed signal delivered from an output rotation sensor 82 to represent a rotation speed $N_{OUT}$ of an output rotation member of the transmission 40; a motor rotation speed signal delivered from a motor rotation sensor (such as a resolver) 84 to represent a rotation speed $N_M$ of the electric motor incorporated in the transmission 40; and a brake operation signal delivered from a brake switch 86 to represent a foot-brake operation $B_{ON}$.

Further, the electronic control section 20 outputs various output signals including: an engine-output control command signal for controlling for instance an engine output; a hybrid-motor control command signal for commanding the electric motor in the transmission 40 to operate; a shift-range switching control command signal for switching the shift ranges in the transmission 40; a shift-range display control command signal operative to activate an indicator (shift range display device) 90 to display a switched state of the shift ranges in the transmission 40, and a parking-lock display control command signal for displaying a parking lock state; and a P-switching control command signal for commanding the parking lock device 50 to operate, etc.

More particularly, the electronic control section 20 includes a power-source control computer (hereinafter referred to as a "PM-ECU") 22, a hybrid control computer (hereinafter referred to as a "HV-ECU") 24, a parking control computer (hereinafter referred to as "P-ECU") 26, a verification computer (hereinafter referred to as a "verification ECU 27"), and a key slot (hereinafter referred to as "ID-BOX") 28. The electronic control section 20 incorporates therein various ECUs and devices among which communications are performed through for instance multiplex communication lines for performing multiplex communications with on-vehicle devices, and direct-connected lines including communication lines such as metallic wires composed of wire harnesses directly connected to ECUs of communication objects and sensors on one-on-one basis. In addition, various signals supplied to the electronic control section 20, and various command signals output from the electronic control section 20, are transmitted and received through wire harnesses or the like each directly connected to, for instance, each ECU and each of the sensors of the communication objects on one-on-one basis.

The PM-ECU 22 switches the vehicle power source between the vehicle power source TURN-ON and the vehicle power source TURN-OFF for instance in response to a power switching signal delivered from the vehicle power source switch 80 operated by the user. Upon detecting the power switching signal being input with the vehicle power source TURN-OFF for instance the PM-ECU 22 turns on a relay (not shown), operative to switch the vehicle power source TURN-ON and the vehicle power source TURN-OFF, upon which the vehicle power source TURN-ON is established. Further, upon detecting a vehicle speed V falling not more than or less than a given vehicle speed V' and the power switching signal being input with the vehicle power source TURN-ON, the PM-ECU 22 turns off the relay upon which the vehicle power source TURN-OFF is established. In addition, when a P-lock state signal delivered from the P-ECU 26 with the vehicle power source TURN-OFF represents the parking lock device 50 with the parking lock remained in a released state, the PM-ECU 22 outputs a signal to the P-ECU 26 for compelling the parking lock to be activated in the parking lock device 50 to switch the shift range to a P-range (such sequence operations being referred to as "auto-P operation"). As used herein, the term predetermined vehicle speed V' refers to a vehicle-halt determining vehicle speed preliminarily obtained on experimental tests and stored for instance to determine as to whether a vehicle halt state is established.

The HV-ECU 24 for instance performs an overall control of an operation of the transmission 40. For instance, the HV-ECU 24 detects a brake operation signal representing the foot-brake operation $B_{ON}$ being input when the PM-ECU 22 switches the vehicle power source TURN-OFF to the vehicle power source TURN-ON. Then, the HV-ECU 24 start-up a hybrid system for the vehicle running, and outputs a hybrid motor control command related to the vehicle running to the transmission 40 for controlling the vehicle running. Moreover, the HV-ECU 24 outputs a shift range switching control command in response to the positional signals, depending on the shift position $P_{SH}$ delivered from the shift sensor 36 and the select sensor 38 to the transmission 40 for thereby switching the shift ranges. In addition, the HV-ECU 24 outputs the P-switching signal to the P-ECU 26 for switching the shift range between the P-range and the non-P-range in the transmission 40 in response to the P-switching signal delivered from the P-switch 34.

Further, the HV-ECU 24 outputs shift display control command signals (including a shift range display control command signal and a parking-lock display control command signal) to an indicator 90 for displaying a state of the shift range. The indicator 90 displays the state of the shift range in response to the shift range display control command signal output from the HV-ECU 24. With the present embodiment, further, the term "TURN-ON" of the vehicle power supply refers not only to one state but also to the other state. In one state, the hybrid system described above is started up to enable the vehicle to run. In the other state, even if the vehicle is disabled to run (the hybrid control of the motor such as the electric motor or the like is disabled), at least the shift range of the transmission 40 can be controllably switched.

For switching the shift range between the P-range and the non-P-range in response to the P-switching signal delivered from for instance the HV-ECU 24, the P-ECU 26 controllably drives the parking lock device 50 for operating or releasing the parking lock. Further, the P-ECU 26 determines in response to the P-position signal delivered from the parking lock device 50 and representing an activated state of the parking lock, as to whether the shift range of the transmission 40 remains in the P-position or the non-P-position. The determined result is output as a P-lock state signal to the PM-ECU 22 and the HV-ECU 24 or the like.

In addition, when the vehicle power supply is switched from the TURN-OFF state to the TURN-ON state, the P-ECU 26 allows the parking lock device 50 to execute the initial drive control as described below and to execute control to detect the P wall position and the non-P wall position such that the P position signal and the non-P position signal can be properly obtained. Moreover, the P-ECU 26 executes the initial operations (initial processing) thereof before the parking lock device 50 executes the series of initial controls when the vehicle power supply is switched from the TURN-OFF state to the TURN-ON state.

Further, during the TURN-OFF of the vehicle power supply, the P-ECU 26 can establish a wake state under which the series of the initial control of the parking lock device 50 achieved in a running state or an operation state switched from a halt state when the vehicle power supply is switched from the TURN-OFF state to the TURN-ON state can not be executed, but the vehicle information can be detected, i.e., a function of the vehicle such as a functional check etc. during a halt of the vehicle can be activated. That is, by turning on the vehicle power supply, the P-ECU 26 establishes a running state corresponding to a first operating state under which the parking lock device 50 is enabled to perform the series of initial controls. By turning off the vehicle power supply, the P-ECU 26 establishes the halt state in the form of a second operating state under which the series of initial controls is disabled. Besides these functions, the P-ECU 26 can establish the wake state corresponding to a third operating state under which the series of initial controls can be disabled but detection of vehicle information is enabled. Under such a wake state, electric power is supplied to the P-ECU 26 from another power supply separate from the vehicle power supply arranged to supply electric power to the P-ECU 26 when for instance the vehicle power supply is turned on.

Further, the P-ECU 26 is an ECU, capable of continuously performing the control as described above when the vehicle power supply remains in the TURN-OFF, i.e., an ECU capable of establishing the wake state in spite of or independent of the TURN-ON state or the TURN-OFF state that are controllable by the PM-ECU 22. Upon detection of a certain condition in response to signals output from the sensor and the switch or the like on the supposition that a user has moved away from the vehicle, the wake state is shifted to a sleep state in a low current consumption mode to reduce dark current.

During transition from the sleep state to the wake state, the P-ECU 26 executes the initial operations (initial processing) thereof. Accordingly, when the wake state is shifted to the running state, the initial operations of the P-ECU 26 already executed is executed again. For these reasons, when the vehicle power supply is switched from the TURN-OFF state to the TURN-ON state, the P-ECU 26 is switched to the wake state to execute the initial processing, and subsequently, the P-ECU 26 is switched to the running state.

The function of the vehicle such as the functional check, etc. executed under the halt of the vehicle and is activated in the wake state of the P-ECU 26, is a so-called immobilizer function that is well known as a vehicle antitheft function. This inhibits the TURN-ON of the vehicle power supply (i.e., for instance, a startup of a hybrid system) when for instance an other key than an original key registered on an own vehicle is used. The immobilizer function can be realized using for instance a verification ECU 27 and an ID-BOX 28. Further, another function of the vehicle such as the functional check, etc. for the halt of the vehicle to be activated in the wake state of the P-ECU 26, includes an antitheft function that disables switching of the transmission 40 to the non-P range to cancel the parking lock in response to for instance an operation of the P switch 34 executed by the user.

The ID-BOX 28 detects an inserted state of for instance the key (not shown) to output a detection result to for instance the verification ECU 27 and the P-ECU 26. The P-ECU 26 takes the wake state upon detecting the key being inserted. In addition, a communication chip incorporated in for instance the key, transmits an ID code to the verification ECU 27 via the ID-BOX 28.

The verification ECU 27 receives the ID code delivered from the key via for instance the ID-BOX 28 for verification with a vehicle registered ID. Then, the communication chip incorporated in the key outputs a verification result between the ID code of the key and the vehicle registered ID to the PM-ECU 22 and the P-ECU 26 via the ID-BOX 28 or the verification ECU 27. If the verification results in a coincidence between the ID code of the key and the vehicle registered ID, then, the immobilizer system is cancelled, thereby permitting the vehicle power supply to be switched to the TURN-ON state.

Figure 2:
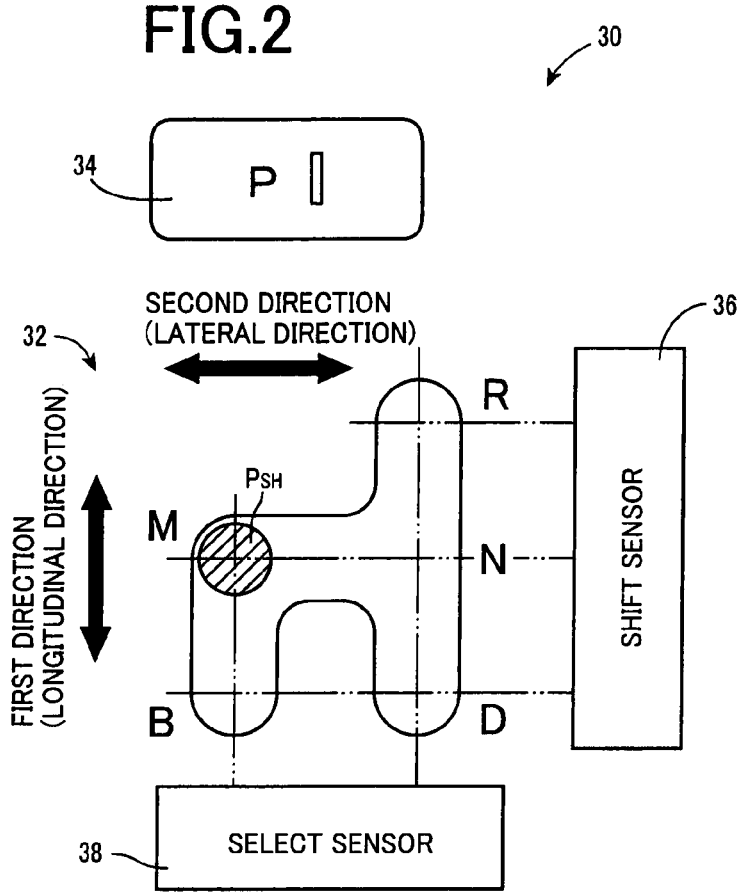
FIG. 2 is a graph showing one example of a shift operation device in the form of a switching device arranged to switch a plural kinds of shift ranges in a transmission by a manual operation.

FIG. 2 is a view illustrating one example of the shift operation device 30 acting as a switching device for switching plural kinds of shift ranges in the transmission 40 by a manual operation. The shift operation device 30, mounted in an area close proximity to for instance a driver's seat, includes a shifting lever 32 structured in the form of a momentary type operatively movable to a plurality of shift positions $P_{SH}$, i.e., an automatic return type as the operating lever automatically returned to an original position (initial position) with release of the operating force. Further, the shift operation device 30 of the present embodiment includes a P-switch 34, mounted as an independent switch in an area close proximity to the shift lever 32, to serve as a momentary type operating element for switching the shift range of the transmission 40 to the parking range (P-range) for the parking lock.

The shift lever 32 has an arrangement to be operable to three shift positions $P_{SH}$, arranged in a fore and aft direction or a vertical direction, i.e., a longitudinal direction of the vehicle as shown in FIG. 2, which includes a position "R" (R-position), a position "N" (N-position) and a position "D" (D-position), and a position "M" (M-position) and a position "B" (B-position) arrayed in parallel to a layout of the former three positions. Thus, the positional signal is output to the HV-ECU 24 depending on the shift positions $P_{SH}$. Further, the shift lever 32 can be operated in the longitudinal direction to one of the R-position, the N-position and the D-position, can be operated in the longitudinal direction between the M-position and the B-position, and can be operated in a lateral direction of the vehicle intersecting the longitudinal direction thereof to have one of the N-position and the B-position.

The P-switch 34 is for instance a momentary type push-button switch, which outputs the P-switching signal to the HV-ECU 24 in each depression by the user. If the P-switch 34 is depressed with the shift range of the transmission 40 switched in for instance the non-P-range, the P-ECU 26 causes the shift range to switch to the P-range in response to a P-switching signal delivered from the HV-ECU 24, provided that a predetermined condition such as the vehicle remained under a halted condition is satisfied. The P-range represents a parking range in which the parking lock is performed by a power transmitting path being interrupted in the transmission 40 and the parking lock device 50 mechanically blocks the drive wheels from rotating.

The M-position of the shift operation device 30 represents an initial position (home position) of the shift lever 32. Even if the shift lever 32 is shifted to the shift positions $P_{SH}$ (the positions "R", "N", "D" and "B") other than the M-position, it is returned to the M-position by the action of a mechanical mechanism such as a spring or the like, when the user releases the shift lever 32, i.e., when an external force, acting on the shift lever 32, is removed. With the shift operation device 30 operatively shifted to each shift position $P_{SH}$, the HV-ECU 24 allows the shift range to be switched to a shift range associated with the shift position $P_{SH}$ subsequent to the shift operation in response to the shift position $P_{SH}$ (positional signal). In addition, the indicator 90 displays the current shift position $P_{SH}$, i.e., a state of the shift range in the transmission 40.

Description will be provided of the respective shift ranges. The R-range, selected when the shift lever 32 is operated to the position "R", represents a reverse-drive running range in which a drive force is transmitted to the drive wheels to drive the vehicle in a reverse direction. Further, the neutral range (N-range), selected when the shift lever 32 is operated to the position "N", represents a neutral range to establish a neutral state under which the power transmitted path is interrupted in the transmission 40. Furthermore, the D-range, selected when the shift lever 32 is operated to the position "D", represents a forward-drive running range in which a drive force is transmitted to the drive wheels 38 to drive the vehicle in a forward direction.

If the shift range is switched to for instance the P-range, the HV-ECU 24 determines that the shift operation is executed to a predetermined shift position $P_{SH}$ (particularly, the position "R", the position "N" or the position "D") for releasing a halted movement (in a parking lock) of the vehicle. Then, the HV-ECU 24 outputs a P-switching signal to the P-ECU 26 for releasing the parking lock. A P-switching control command signal is output from the P-ECU 26 to the parking lock device 50 in response to the P-switching signal delivered from the HV-ECU 24 for releasing the parking lock. Then, the HV-ECU 24 allows the shift range to be switched to a shift range associated with a shift position $P_{SH}$ subsequent to such a shift operation.

Further, the B-range, selected when the shift lever 32 is operated to the position "B", represents a reduced-speed forward-drive running range (engine braking range), for instance by causing the electric motor to generate regenerative torque in the D-range, to provide an engine braking effect for reducing rotation of the drive wheels. Accordingly, even if the shift lever 32 is operatively shifted to the position "B" from the current shift range other than the D-range, the HV-ECU 24 causes such a shift operation to be ineffective. The shift operation to the position "B" is caused effective only when in the current shift range is the D-range. For instance, even if the driver performs the shift operation to the position "B" from the P-range, the shift range is remained in the P-range.

In the shift operation device 30 of the present embodiment, the shift lever 32 is returned to the position "M" in the removal of an external force acting thereon. Thus, a mere visual contact with the shift position $P_{SH}$ of the shift lever 32 can not recognize the shift range being selected. Therefore, the indicator 90 is located in a position to be easily visible for the driver to display such information inclusive of the sift range being selected in the P-range.

The shift operation device 30 of the present embodiment adopts the so-called shift-by-wire to be operated in two-dimensional directions including the first direction aligned in the longitudinal direction, and the second direction in line with the lateral direction intersecting with (orthogonal to in FIG. 2) the first direction. Accordingly, for the shift position $P_{SH}$ to be output to the electronic control section 20 as a detection signal of the position sensor, there are provided the shift sensor 36 acting as a first detecting section for detecting the shift operation in the first direction, and the select sensor 38 acting as a second detecting section for detecting the shift operation in the second direction. Voltages as the detection signals (positional signals) are output from both of the shift sensor 36 and the select sensor 38 to the electronic control section 20 depending on the shift position $P_{SH}$. Then, the electronic control section 20 recognizes (determines) the shift position $P_{SH}$ based on such detection signal voltages. That is, it can be said that the first detecting section (shift sensor 36) and the second detecting section (select sensor 38) form a shift position detecting section as a whole to detect the shift position $P_{SH}$ of the shift operation device 30.

Figure 3:
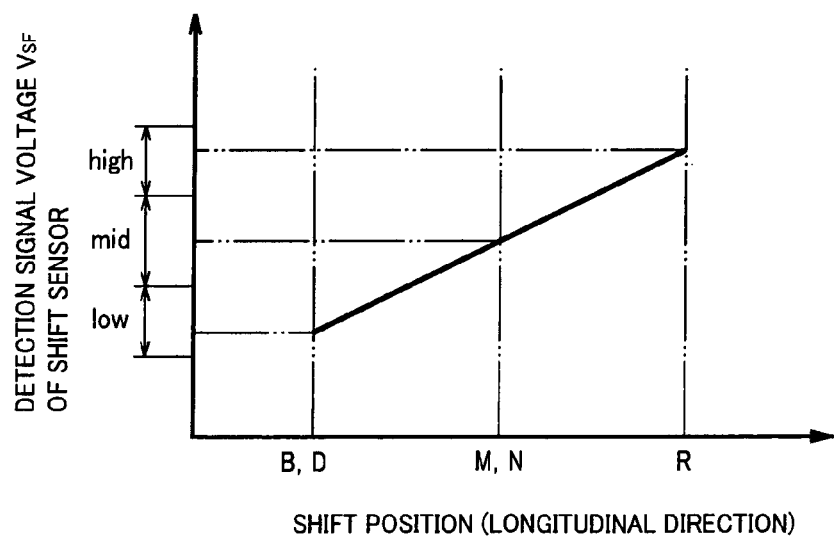
FIG. 3 is a view showing the relationship between a longitudinally extending shift position of a shift operation device and a detection signal voltage of a shift sensor incorporated in the shift operation device.

To describe one example of recognition of the shift position $P_{SH}$, the shift sensor 36 provides a detection signal voltage $V_{SF}$ as shown in FIG. 3. The detection signal voltage $V_{SF}$ takes various voltages including: a voltage falling in a low range in the presence of the shift position $P_{SH}$ in the longitudinal direction (first direction) switched to the position "B" or "D"; a voltage falling in a med range higher than that of the low range in the presence of the position "M" or "N"; and a voltage falling in a high range higher than that of the med range in the presence of the position "R". Further, as shown in FIG. 4, the detection signal voltage $V_{SL}$ of the lever sensor 38 takes various voltages, which includes: a voltage falling in a low range in the presence of the shift position $P_{SH}$ relevant to the lateral direction (second direction) switched to the position "M" or "B"; and a voltage falling in a high range higher than that of the low range in the presence of the position "R", "N" or "D".

Figures 4, 5:
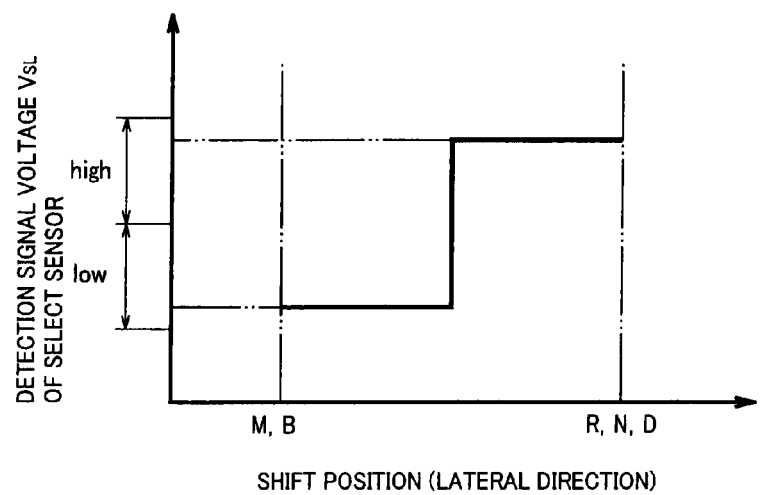
FIG. 4 is a view showing the relationship between a laterally extending shift position of the shift operation device shown in FIG. 2, and a detection signal voltage of a select sensor incorporated in the shift operation device.
FIG. 5 is a view illustrating a correlation between combination of the detection signal voltages of the shift sensor and the select sensor, and the shift positions.

Upon detecting the detection signal voltages $V_{SF}$ and $V_{SL}$ as shown in a diagram shown in FIG. 5, the HV-ECU 24 recognizes that: if "$V_{SF}$=mid and $V_{SL}$=high", the shift position $P_{SH}$ is switched to the position "N"; if "$V_{SF}$=high and $V_{SL}$=high", the shift position $P_{SH}$ is switched to the position "R"; if "$V_{SF}$=low and $V_{SL}$=high", the shift position $P_{SH}$ is switched to the position "D"; if "$V_{SF}$=mid and $V_{SL}$=low", the shift position $P_{SH}$ is switched to the position "M"; and if "$V_{SF}$=low and $V_{SL}$=low", the shift position $P_{SH}$ is switched to the position "B". In FIG. 3, further, although the various ranges such as the range "low", the range "mid" and the range "high" are continuous, these ranges may have a dead band that disenables a determination. In addition, properties of the detection signal voltage $V_{SF}$ of the select sensor 38, i.e., characteristics ranging from "low" to "high" relative to the shift position $P_{SH}$ in the lateral direction may vary from "high" to "low" oppositely.

Thus, the shift position $P_{SH}$ is recognized by the HV-ECU 24. However, to prevent the erroneous operation and erroneous recognition (determination) or the like, the shift range is not immediately switched to the shift range associated with the shift position $P_{SH}$ subsequent to the shift operation even when the shift operation establishes such a shift position $P_{SH}$. Predetermined range fixing times (shift operation fixing times) are preliminarily set for respective shift positions $P_{SH}$ or respective shift ranges. For instance, if the shift lever 32 remains at the shift position $P_{SH}$ subsequent to the shift operation for a time period, i.e., a residence time exceeding the predetermined range fixing time, the HV-ECU 24 allows such a shift operation to be fixed for switching to the shift range associated with the shift position $P_{SH}$ subsequent to the shift operation. Description will be provided of an exemplary case where the shift range is switched from the P-range to the N-range. When the position "M" is switched to the position "N" with the shift range remained in the position "P", the staying time of the shift lever 32 in the position "N" exceeds a neutral range fixing time representing the predetermined range fixing time for fixing the shift operation to the position "N". Then, the HV-ECU 24 fixes (determines) that the shift position $P_{SH}$ subsequent to the shift operation is the position "N", thereby switching the P-range to the N-range in the transmission 40.

Figure 6:
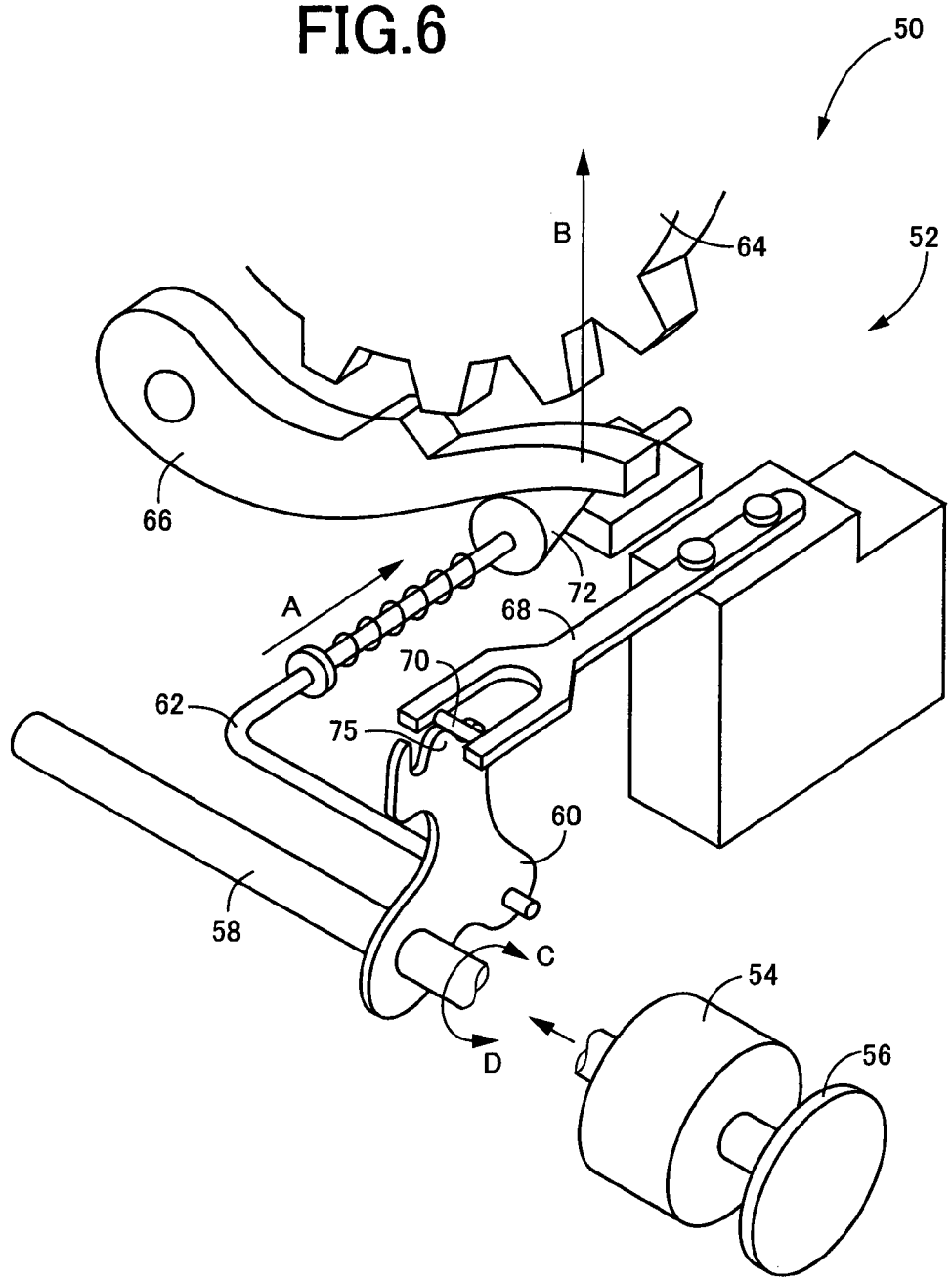
FIG. 6 is a view illustrating a structure of a parking lock device arranged to mechanically block the rotations of drive wheels.

FIG. 6 is a view illustrating a structure of the parking lock device 50 arranged to mechanically block the drive wheels from rotating. In FIG. 6, the parking lock device 50 is an actuator including a P-lock mechanism 52, a P-lock drive motor 54 and an encoder 56, etc., and operates to block the movement of the vehicle in response to a control signal delivered from the electronic control section 20 (e.g. P-ECU 26).

The P-lock drive motor 54 is an actuator constituted of a switched reluctance motor (SR motor) to drive the P-lock mechanism 52 with a shift-by-wire system upon receipt of a command (control signal) from the P-ECU 26. The encoder 56 is a rotary encoder, arranged to output signals in phases "A", "B" and "Z", which unitarily rotates with the P-lock drive motor 54 for detecting a rotary state of the SR motor. Thus, the encoder 56 supplies the P-ECU 26 with a signal representing such a rotary state, i.e., a pulse signal for acquiring a count value (encoder count) depending on displacement amount (rotated amount) of the P-lock drive motor 54. Upon receipt of such a signal supplied from the encoder 56, the P-ECU 26 grasps the rotary state of the SR motor for performing a power distribution control thereto.

The P-lock mechanism 52 includes: a shaft 58 drivably rotated with the P-lock drive motor 54; a detent plate 60 rotatable with the shaft 58 in rotation thereof; a rod 62 operable with the detent plate 60 in rotation thereof; a parking gear 64 rotatable in conjunction with the drive wheels; a parking lock pole 66 operative to block (lock) the rotation of the parking gear 64; a detent spring 68 operative to limit the rotation of the detent plate 60 for the shift position to be fixedly secured; and a roller or skid 70. A disposing position of the parking gear 64 is not limited as long as locking of the parking gear 64 locks the drive wheels. The parking gear 64 is fixed on for instance the output rotation member of the transmission 40.

The detent plate 60 is operatively connected to a drive shaft of the P-lock drive motor 54 via the shaft 58, and is driven by the P-lock drive motor 54 together with the rod 62, the detent spring 68 and the roller 70, etc. The detent plate 60 functions as a parking lock positioning member to switch a parking lock position associated with the P-range, and a non-parking lock position associated with the respective shift ranges other than the P-range. The shaft 58, the detent plate 60, the rod 62, the detent spring 68 and the roller 70 operate a parking lock switching mechanism.

FIG. 6 shows a state under which the non-parking lock position is established. Under such a state, since no parking lock pole 66 locks the parking gear 64, no P-lock mechanism 52 blocks the drive wheels from rotating. Under such a state, rotating the shaft 58 in a direction as indicated by an arrow C in FIG. 6 by the P-lock drive motor 54 pushes the rod 62 in a direction as indicated by an arrow A in FIG. 6 via the detent plate 60. This causes a taper member 72 mounted on the rod 62 at a distal end thereof to push up the parking lock pole 66 in a direction as indicated by an arrow B in FIG. 6. As the detent plate 60 is rotated, the roller 70 of the detent spring 68 placed in one of two valleys, i.e., a non-parking lock position 74 (hereinafter referred to as a "non-P position 74" (see FIG. 7)) formed on the detent plate 60 at a top thereof, is caused to ride over a ridge 75 into the other one of the valleys, i.e., a parking lock position 76 (hereinafter referred to as a "P position 76" (see FIG. 7)). The roller 70 is provided on the detent spring 68 to be rotatable about its center axis. When the detent plate 60 is rotated until the roller 70 reaches the P position 76, the parking lock pole 66 is pushed up to a position engageable with the parking gear 64. This mechanically blocks the drive wheels from rotating in conjunction with the parking gear 64, so that the shift range is switched to the P-range.

In the parking lock device 50, during the operation to switch the shift range between the P range and the non-P range, for lessening loads exerted on the components of the P-lock mechanism 52 such as the detent plate 60, the detent spring 68 and the shaft 58, for instance, the P-ECU 26 controls a rotational amount of the P-lock drive motor 54 so as to lessen an impact occurring when the roller 70 of the detent spring 68 passes across the ridge 75 and drops.

Figure 7:
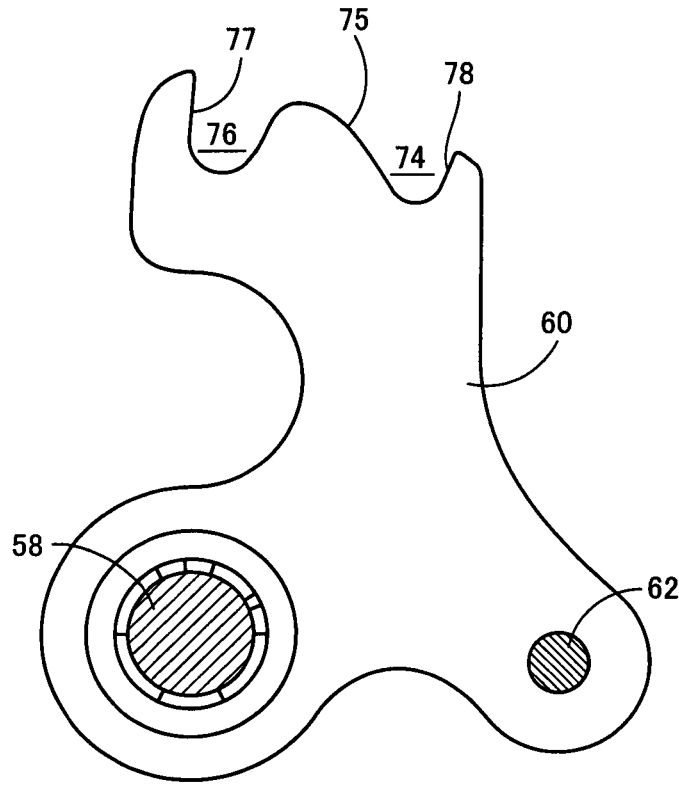
FIG. 7 is a view illustrating a structure of a detent plate.

FIG. 7 is a view illustrating a structure of a detent plate 60. The detent plate 60 has valleys formed with surfaces distanced away from the ridge 75 which will be referred to as "walls". That is, the walls are present at positions in abutting contact with the roller 70 of the detent spring 68 crossing over the ridge 75 and drops onto bottoms of the valleys, when the control described below is not executed by the P-ECU 26. The wall relevant to the P position 76 is referred to as a "P wall" and the wall relevant to the non-P position 74 is referred to as a "non-P wall". When the roller 70 moves away from the P position 76 to the non-P position 74, the P-ECU 26 controls the P-lock drive motor 54 such that the non-P position wall 78 does not strike or collide against the roller 70. More particularly, the P-ECU 26 stops the rotation of the P-lock drive motor 54 before the non-P position wall 78 reaches a position to strike against the roller 70. This position will be referred to as a "non-P target rotational position".

In addition, when the roller 70 moves away from the non-P position 74 to the P position 76, the P-ECU 26 controls the P-lock drive motor 54 such that the P wall 77 does not strike or collide against the roller 70. More particularly, the P-ECU 26 sops the rotation of the P-lock drive motor 54 at a position before the P wall 77 reaches a position to strike against the roller 70. This position will be referred to as a "P target rotational position". With the P-lock drive motor 54 controlled by the P-ECU 26, it becomes possible to remarkably lessen the loads exerted on the components of the P-lock mechanism 52 such as the detent plate 60, the detent spring 68 and the shaft 58 or the like during the switching of the shift range. Reducing the loads enables the P-lock mechanism 52 to be light-weighted and low-cost.

Figure 8:
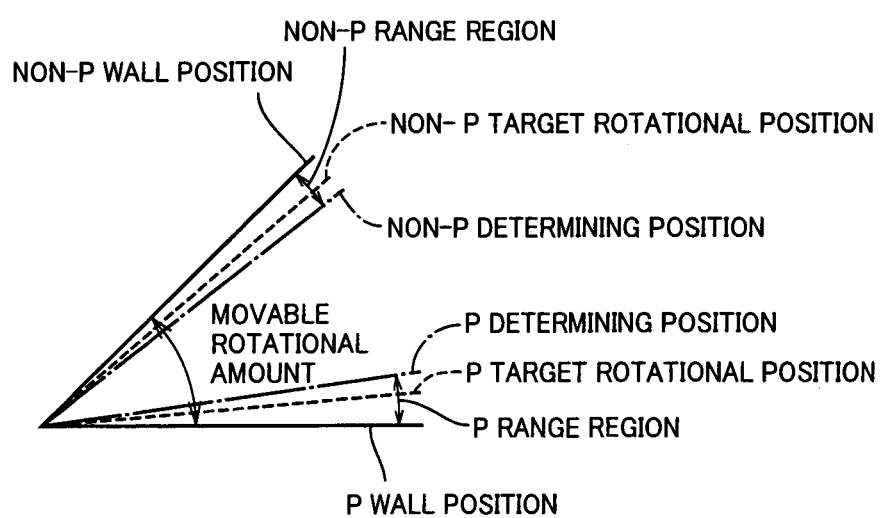
FIG. 8 is a view illustrating the correlation between a rotational amount, i.e., an encoder count of an actuator (lock-drive motor) and a shifting position.

FIG. 8 is a view illustrating a correlation between the rotational amount of the P-lock drive motor 54, i.e., an encoder count, and the shift range. The P-lock drive motor 54 drivably rotates the detent plate 60, and its rotational amount is restricted by the P wall 77 and the non-P position wall 78. FIG. 8 conceptually shows a position (P wall position) of the P wall 77 and a position (non-P wall position) of the non-P position wall 78 used in controlling the rotation of the P-lock drive motor 54. An area between the P wall position and the non-P wall position will be referred to as a "movable rotational amount" of the P-lock drive motor 54. Further, both of a P determining position and a non-P determining position shown in FIG. 8, are predetermined positions of the detent plate 60 to determine whether to switch the shift range. That is, an area between the P determining position and the P wall position is to a P range region and another area between the non-P determining position and the non-P wall position is to a non-P range region. When the rotational amount of the P-lock drive motor 54 detected by the encoder 56 falls in the P range region, it is determined that the shift range belongs to the P range. When the rotational amount of the P-lock drive motor 54 falls in the non-P range region, it is determined that the shift range belongs to the non-P range. Moreover, when the rotational amount of the P-lock drive motor 54 falls in a region between the P determining position and the non-P determining position, then, it is determined that the shift range is uncertain or the shift range is under the switching state. The determinations described above are executed by the P-ECU 26.

As shown in FIG. 8, further, a P target rotational position is set in the P range region and a non-P target rotational position is set in the non-P range region. The P target rotational position represents a position, at which the P wall 77 does not strike against the roller 70 of the detent spring 68 when the non-P range is switched to the P range, and it is determined to be spaced from the P wall position by a predetermined margin. The predetermined margin is set to have an allowance in consideration of rattle that would be caused by deterioration with age. This absorbs deterioration with age until they are used a certain number of times, thereby avoiding a collision between the P wall 77 and the roller 70 when the shift range is switched from the non-P range to the P range.

Likewise, the non-P target rotational position represents a position, at which the non-P wall 78 does not strike against the roller 70 of the detent spring 68 when the P range is switched to the non-P range, and it is determined to be spaced from the non-P wall position by a predetermined margin. The predetermined margin is set to have an allowance in consideration of rattle caused by deterioration with age. This absorbs deterioration with age until they are used a certain number of times, thereby avoiding a collision between the non-P wall 78 and the roller 70 when the shift range is switched from the P range to the non-P range. In addition, the margin with respect to the non-P wall position and the margin with respect to the P wall position do not need to be identical to each other and may be different from each other depending on a shape, etc., of the detent plate 60.

In the parking lock device 50 configured in such a structure, the PM-ECU 22 acquires the encoder count depending on the rotational amount of the P-lock drive motor 54, in response to a pulse signal output from the encoder 56. Further, when the vehicle power supply is switched to the TURN-ON state, the PM-ECU 22 resets the encoder count to zero for sequentially updating the encoder count based on a subsequent signal output from the encoder 56. In the illustrated embodiment, furthermore, the encoder count, occurring when rotated (rotation as shown by an arrow C in FIG. 6) in a direction toward the P wall position, is set to be negative. Moreover, the PM-ECU 22 controls the P-lock drive motor 54 such that the acquired encoder count matches a predetermined target encoder count (a target encoder count value and a target count value). The target count value is a target value that is preliminarily determined on experimental tests so as to stop for instance the P-lock drive motor 54 at the P target rotational position and the non-P target rotational position.

In the foregoing, the correlation between the rotational amount of the P-lock drive motor 54 and the shift range has been described. Meanwhile, the encoder 56 which is a relative position sensor needs to grasp an absolute position of the P-lock drive motor 54. Hereunder, detailed description will be provided of a method of performing a positional control of the P-lock drive motor 54 using an encoder 56 configured to detect relative positional information.

Figure 9:
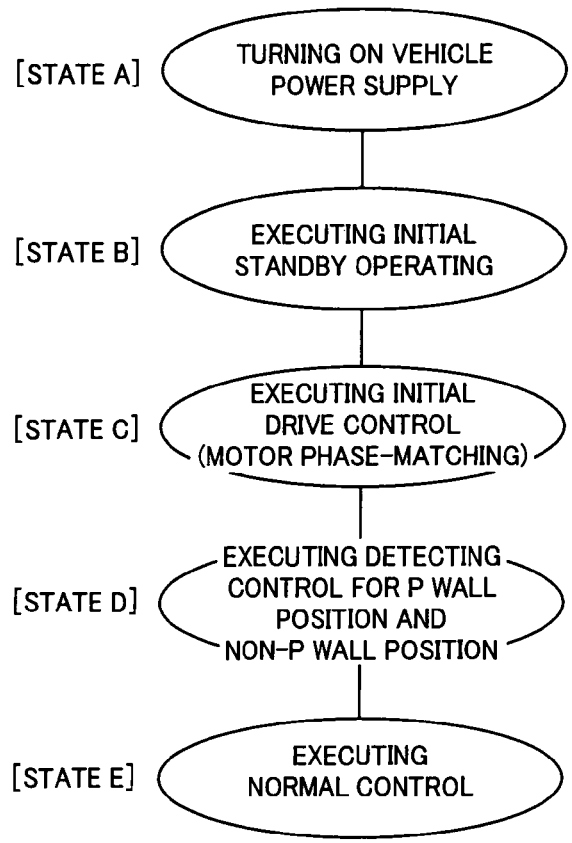

FIG. 9 is a state transition view illustrating a series of initial controls to be executed by the parking lock device 50 when the vehicle power supply is turned on. In FIG. 9, as the PM-ECU 22 turns on the vehicle power supply (under a State "A"), the P-ECU 26 executes an initial standby operation (under a "State B") for a waiting period in which a relay of the P-lock drive motor 54 is connected. Under such a State B for instance the P-ECU 26 is switched from a sleep state to a wake state to perform an initial processing thereof. Subsequently, the P-ECU 26 executes an initial drive control (under a "State C") including excitation-matching (phase-matching) etc. of the P-lock drive motor 54 for appropriately controlling the rotation thereof. Consecutively, the P-ECU 26 detects the P wall position and the non-P wall position of the P-lock drive motor 54 for setting a reference position (under a "State D"). After the reference position is set, the P-ECU 26 executes a normal control (under a "State E") for activating and canceling parking lock depending on the P switch 34 being operated by for instance a user. Hereunder, description will be provided of a control method of detecting the P wall position and the non-P wall position under the State D described above.

Figure 10:
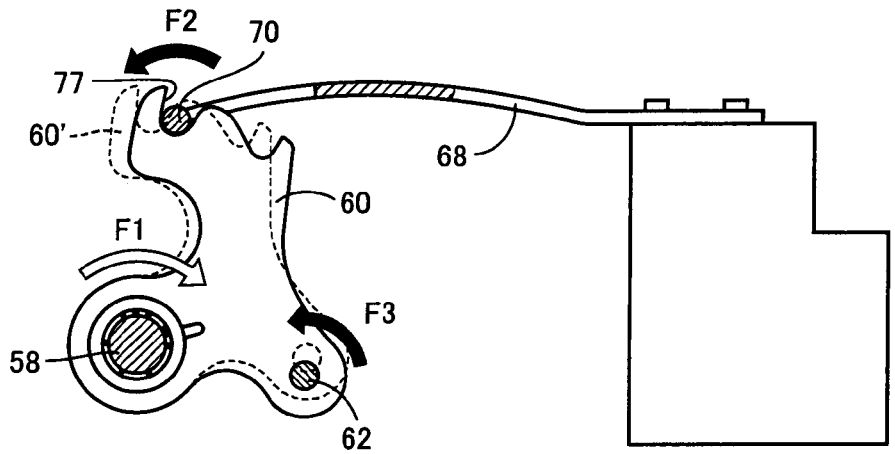
FIG. 10 is a view illustrating a control method of detecting a P wall position.

FIG. 10 is a view illustrating the control method of detecting the P wall position. In a P-wall position detecting control, first, the P-ECU 26 drives the P-lock drive motor 54 to rotate the detent plate 60 in the direction as shown by the arrow C in FIG. 6, i.e., in a direction to move the P wall 77 toward the roller 70 of the detent spring 68 such that the roller 70 and the P wall 77 are brought into contact with each other. The P wall 77 functions as a restricting member in the P position 76, i.e., in the P range of a predetermined shift range, for restricting the rotation of the P-lock drive motor 54 in the direction as shown by the arrow C in FIG. 6 corresponding to a predetermined direction. In addition, the P wall 77 may constitute the restricting member in association with the detent spring 68 and the roller 70. In FIG. 10, an arrow F1 indicates a rotational force of the P-lock drive motor 54; an arrow F2 indicates a spring force of the detent spring 68; and an arrow F3 indicates a returning push-back force exerted by the rod 62. The detent plate 60' indicated by a dotted line indicates a position at which the P wall 77 and the roller 70 are brought into contact with each other. Accordingly, detecting a position of the detent plate 60' corresponds to detection of the position of the P wall 77.

Even after the P wall 77 and the roller 70 are brought into contact with each other, the detent plate 60 is rotated from a position indicated by the dotted line in the direction indicated by the arrow C in FIG. 6, against the tensional force of the detent spring 68 due to the rotational force F1 of the P-lock drive motor 54. This causes the detent spring 68 to flex, so that the spring force F2 is increased and the returning push-back force F3 by the rod 62 is increased. The detent plate 60 is halted in rotation when the rotational force F1 balances with the spring force F2 and the returning push-back force F3.

The P-ECU 26 determines in response to the acquired encoder count if the detent plate 60 is halted in rotation. For instance, the P-ECU 26 determines that the detent plate 60 and the P-lock drive motor 54 are halted in rotation when no variation occurs in a minimal value or a maximal value of the encoder count for a predetermined period of time. Monitoring the minimal value or the maximal value of the encoder count may be determined depending on the encoder 56. Anyway, a state under which no variation takes place in the minimal value or the maximal value for the predetermined period of time represents halt of the detent plate 60 in movement.

The P-ECU 26 detects a position of the detent plate 60 halted in rotation as a provisional P-wall position (hereinafter referred to as a "provisional P wall position") and further calculates a flexing amount or a flexing angle of the detent spring 68. The flexing amount or the flexing angle are calculated using a map, representing the relationship between a voltage applied to the P-lock drive motor 54, and the flexing amount or the flexing angle associated therewith preliminarily stored in for instance the P-ECU 26. The P-ECU 26 calculates the flexing amount or the flexing angle associated with the voltage applied to the P-lock drive motor 54 when the provisional P wall position is detected, by referring to such a map. Further, the map may be of the type using a battery voltage monitored by for instance the P-ECU 26 and easily detected, in place of the applied voltage of the P-lock drive motor 54. In such a case, furthermore, the map is prepared upon taking a voltage drop, caused by a wire harness or the like extending from a battery to the P-lock drive motor 54, into consideration.

The P-ECU 26 corrects the map of the provisional P wall position in terms of the flexing amount or the flexing angle calculated using such a map to fix or to determine the position subjected to the map correction, as the P wall position. Here, the P-ECU 26 sets the encoder count to CNTP for the fixed P wall position. Then, the P-ECU 26 drives the P-lock drive motor 54 such that the encoder count is zeroed to rotate the detent plate 60 in a direction as indicated by an arrow D in FIG. 6, i.e., in a direction to move the P wall 77 away from the roller 70 of the detent spring 68 to place the detent plate 60 at a predetermined P position. The predetermined P position represents a predetermined position that is preset in the P range region and is set such that a difference of the encoder count between the predetermined position and the determined P wall position is CNTP. Further, this predetermined P position may be set as the P target rotational position. Thus, the P wall position is fixed by which the P target rotational position can be set. Instead of using the map representing the relationship between an output of the P-lock drive motor 54 and the flexing amount or the flexing angle associated therewith, a map may be of the type representing the relationship between the output torque of the P-lock drive motor 54 and the flexing amount or the flexing angle associated therewith. Instead of performing calculation using the map, a sensor for detecting the flexing amount or the flexing angle may be provided to detect such parameters.

Figure 11:
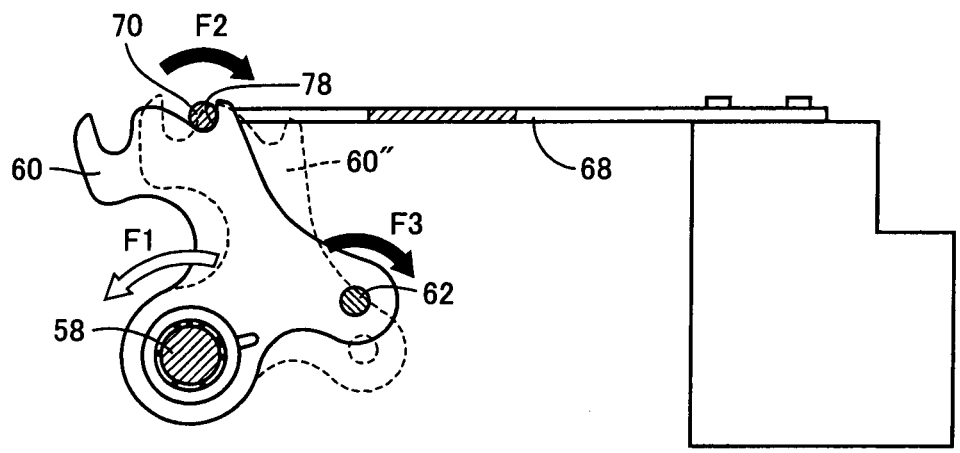
FIG. 11 is a view illustrating a control method of detecting a non-P wall position.

FIG. 11 is a view illustrating the control method of detecting the non-P wall position. In a non-P-wall position detecting control, first, the P-ECU 26 drives the P-lock drive motor 54 to rotate the detent plate 60 in the direction as shown by the arrow D in FIG. 6. That is, the detent plate 60 is rotated such that the non-P wall 78 rotates in a direction to be close to the roller 70 of the detent spring 68 until the roller 70 and the non-P wall 78 are brought into contact with each other. The non-P wall 78 functions as a restricting member in the non-P position 74, i.e., the non-P range of a predetermined shift range, for restricting the rotation of the P-lock drive motor 54 in the direction as shown by the arrow D in FIG. 6 corresponding to a predetermined direction. In addition, the non-P wall 78 may constitute the restricting member together with the detent spring 68 and the roller 70. In FIG. 11, an arrow F 1 indicates the rotational force of the P-lock drive motor 54; an arrow F2 indicates the spring force of the detent spring 68; and an arrow F3 represents the tensional force exerted by the rod 62. The detent plate 60" indicated by a dotted line indicates a position at which the non-P wall 78 and the roller 70 are brought into contact with each other. Accordingly, detecting the position of the detent plate 60" corresponds to detection of the position of the non-P wall 78.

After contact between the non-P wall 78 and the roller 70, the detent plate 60 is rotated, due to the rotational force F1 of the P-lock drive motor 54, from a position indicated by the dotted line in a direction indicated by the arrow D in FIG. 6 against the tensional force of the detent spring 68. This causes the detent spring 68 to flex, so that the spring force F2 is increased and the returning push-back force F3 by the rod 62 is increased. The detent plate 60 is halted in rotation when the rotational force F1 balances with the spring force F2 and the returning push-back force F3.

The P-ECU 26 determines in response to the acquired encoder count if the detent plate 60 is halted in rotation. For instance, the P-ECU 26 determines that the detent plate 60 and the P-lock drive motor 54 are halted in rotation when no variation occurs in the minimal value or the maximal value of the encoder count for the predetermined period of time.

The P-ECU 26 detects the position of the detent plate 60 remained halted in rotation as a provisional non-P-wall position (hereinafter referred to as a "provisional non-P wall position") and further calculates an extension amount of the detent spring 68. The extension amount is calculated using a map representing the extension amount related in terms of the voltage applied to the P-lock drive motor 54 and being stored in for instance the P-ECU 26. The P-ECU 26 calculates the extension amount of the detent spring 68 corresponding to the voltage applied to the P-lock drive motor 54 by referring to such a map when the provisional non-P wall position is detected.

The P-ECU 26 corrects a map or performs a map correction of the provisional non-P wall position in terms of the extension amount, calculated using such a map, to fix or determine the position subjected to the map correction, to be the non-P wall position. Here, the P-ECU 26 sets the encoder count to CNTCP in the fixed non-P wall position. Then, the P-ECU 26 drives the P-lock drive motor 54 to rotate the detent plate 60 in the direction as indicated by the arrow C in FIG. 6, i.e., in a direction to move the non-P wall 78 away from the roller 70 of the detent spring 68 to place the detent plate 60 at a predetermined non-P position. Thus, the encoder count is set to an encoder count CP in which the encoder count is subtracted by a predetermined count value. The predetermined non-P position represents a predetermined position, preliminarily set to the non-P range region, and is set such that a difference of the encoder count between the predetermined non-P position and the determined non-P wall position lies at a predetermined count value. Further, the predetermined non-P position may be set as the non-P target rotational position. Thus, fixing the non-P wall position enables the non-P target rotational position to be set. In place of using the map representing the extension amount related in terms of the applied voltage, the map may be of the type representing the extension amount related in terms of output torque of the P-lock drive motor 54. Instead of performing the calculation using the map, a sensor for detecting the extension amount may be provided to detect such a parameter.

Under the running state of the P-ECU 26 with the vehicle power supply remained turned on, thus, the P-lock drive motor 54 is caused to move in the direction to restrict the movement (rotation) thereof. Here, the wall position of the P-lock drive motor 54 associated with the predetermined shift range is detected on the basis of the acquired encoder count, upon which the reference position can be set.

Figure 12:
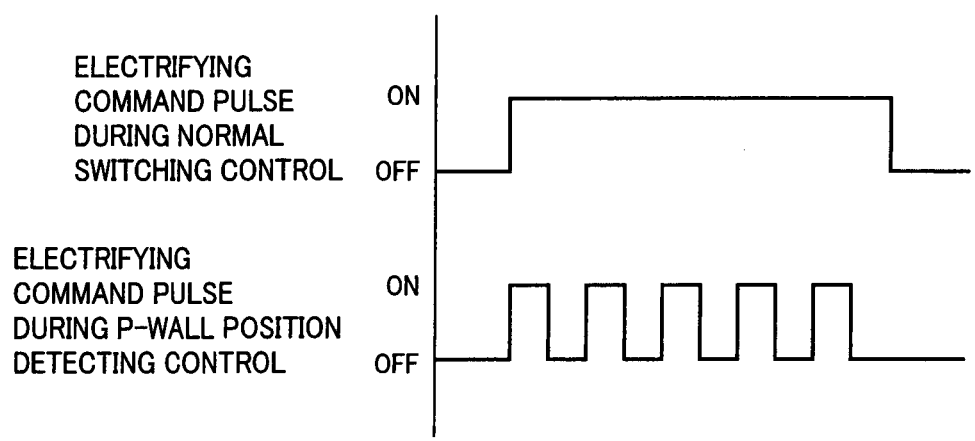
FIG. 12 is a view illustrating waveforms of electrifying command pulses applied to the actuator (lock-drive motor).

FIG. 12 is a view illustrating waveforms of electrifying command pulses applied to the P-lock drive motor 54. During the normal control to switch the shift range, a signal having a long period with a high level is applied as an electrifying command pulse to the P-lock drive motor 54. During the P-wall position detecting control executed by the P-ECU 26, in contrast, another signal is applied as an electrifying command pulse to the P-lock drive motor 54. This signal allows the P-lock drive motor 54 to provide an output per unit time at a rate less than an output per unit time of the P-lock drive motor 54 during the normal control of switching the shift range. More particularly, the electrifying command pulse applied to the P-lock drive motor 54 has a decreased turn-on width. Decreasing the rotational speed of the P-lock drive motor 54 during the wall position detecting control enables a reduction of an impact between the wall and the roller 70. In addition, for instance, when the electrifying command pulse shown in FIG. 12 is turned on and an electrifying command for UVW three phases of the P-lock drive motor 54 are turned on, respective UVW three-phase are electrified.

As mentioned above, during the operation to switch the vehicle power supply to the TURN-ON state, i.e., when the P-ECU 26 is switched to the running state, the initial processing are executed for the P-ECU 26 per se under the wake state thereof. Thereafter, the initial control for the parking lock device 50 is executed under the running state of the P-ECU 26, upon which the wall position is detected. That is, the initial drive control of the P-lock drive motor 54 is executed as the initial control of the parking lock device 50. Subsequently, the P wall position and the non-P wall position of the P-lock drive motor 54 are detected, upon which the reference position is set. That is, an actually movable rotational amount of the P-lock drive motor 54 laying in an area between the two wall positions, can be measured by executing the wall position detecting control for one of the shift ranges to detect one wall position and subsequently executing the wall position detecting control for the other one of the shift range to detect the other wall position. Then, detecting the wall positions enables an absolute position of the P-lock drive motor 54 to be grasped, so that the target rotational position can be set.

In the illustrated embodiment, as set forth above, the P-ECU 26 has operating states that can be switched between the running state representing the first operating state enabling the detection of the reference position for controlling the P-lock drive motor 54 during the initial operation thereof, and the halt state representing the second operating state disabling the detection of such a reference position. In addition to such a halt state and a running state, the P-ECU 26 can be placed in the wake state representing the third operating state disabling to detect such a reference position but enabling to detect vehicle information.

Under a condition where the P-ECU 26 remains in the wake state with for instance the vehicle power supply remained turned off, when the vehicle power supply is switched from the TURN-OFF state to the TURN-ON state to switch the P-ECU 26 from the wake state to the running state, the initial operation of the P-ECU 26 which has been already executed is not executed. Accordingly, when the vehicle power supply is switched from the TURN-OFF state to the TURN-ON state with the P-ECU 26 remained in the wake state, the following situation can be considered. That is, any of the initial drive control of the P-lock drive motor 54 (in the "State C" in FIG. 9) and the wall position detecting control of the P-lock drive motor 54 (in the "State D" in FIG. 9), both executed after executing the initial operation of the P-ECU 26 (under the "State B" in FIG. 9), may not be executed, like the initial operation not executed.

For instance, when the vehicle power supply is switched to the TURN-ON state again after the vehicle power supply has been turned off with the P-ECU 26 continuously remained in the wake state, a mode can be considered wherein any of the initial drive control and the wall position detecting control of the P-lock drive motor 54 is not executed, like the initial operation of the P-ECU 26 not executed. Despite the phase-matching of the P-lock drive motor 54 achieved by the initial drive control and the setting of the reference position of the P-lock drive motor 54 achieved by the wall position detecting control are reset to the initial state due to the TURN-OFF of the vehicle power supply, any of the initial drive control and the wall position detecting control is not executed when the vehicle power supply is turned on. Therefore, for instance, there is a possibility that the P-lock drive motor 54 is not appropriately controlled in rotation and the P range and the non-P range are not properly switched.

In view of the above, in the present embodiment, the electronic control section 20 (e.g. the P-ECU 26) executes the following controls when the P-ECU 26 is switched from the halt state to the running state (e.g. switching of the vehicle power supply from TURN-OFF to TURN-ON) with remaining the P-ECU 26 in the wake state, after switching of the P-ECU 26 from the running state to the halt state (e.g. switching of the vehicle power supply from TURN-ON to TURN-OFF). That is, the electronic control section 20 executes the initial drive control (state "C" in FIG. 9) of the P-lock drive motor 54 and the wall position detecting control (state "D" in FIG. 7) of the P-lock drive motor 54 again. Thus, when the P-ECU 26 is switched from the wake state to the running state, phase matching control of the P-lock drive motor 54 and setting of the reference position of the P-lock drive motor 54 by the wall position detecting control are executed again.

Figure 13:
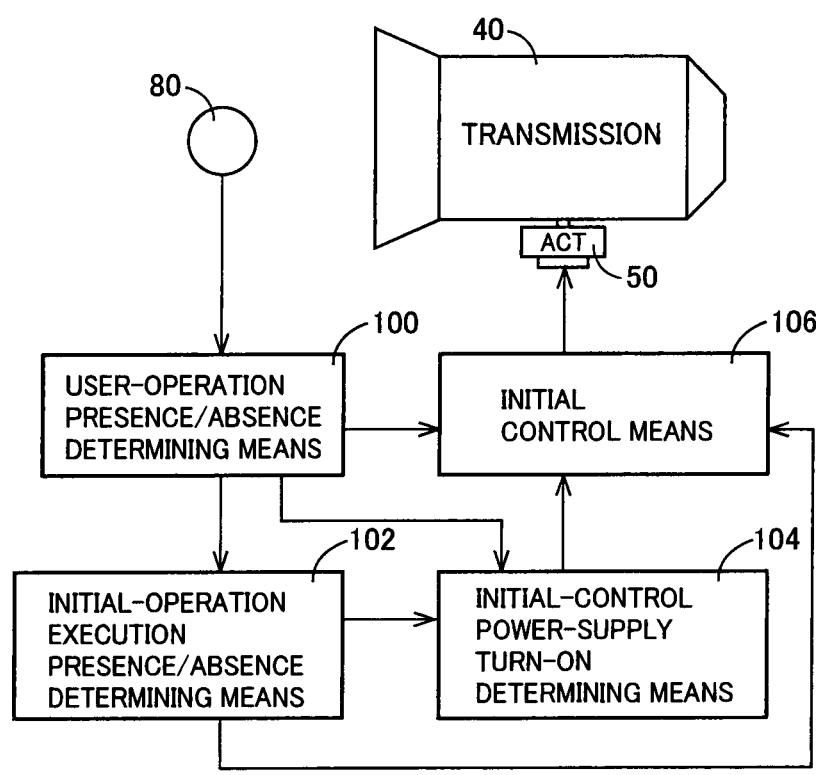
FIG. 13 is a functional block diagram illustrating a major part of a control function of an electronic control section shown in FIG. 1.

FIG. 13 is a functional block diagram illustrating a major part of a control function to be executed by the shift control device 10 (electronic control section 20). In FIG. 13, a user-operation presence/absence determining section, i.e., user-operation presence/absence determining means 100 determines if a user operation is executed to place the P-ECU 26 in for instance the running state involving the wake state. For instance, the user-operation presence/absence determining means 100 operates in response to a power switch signal to determine if a vehicle power switch 80 is depressed down or depressedly operated for switching the vehicle power supply from the TURN-OFF state to the TURN-ON state. Further, the user-operation presence/absence determining means 100 determines if operations to activate only an antitheft function with the P-ECU 26 remained under the wake state, including for instance an operation to open a door of a vehicle, an operation to take a key out of a key slot and an operation to insert the key into the key slot, are executed.

The user-operation presence/absence determining means 100 determines that the user operation is executed to place the P-ECU 26 in the running state involving the wake state. When such user operation is determined, an initial-operation execution presence/absence determining section, i.e., initial-operation execution presence/absence determining means 102, determines if the initial operation is executed for the P-ECU 26 per se owing to such a user operation. For instance, the initial-operation execution presence/absence determining means 102 determines if the P-ECU 26 is switched from the sleep state (or the halt state) to the wake state by the user operation. More particularly, when the switching of the P-ECU 26 from the sleep state to the wake state is determined, the initial-operation execution presence/absence determining means 102 determines that the initial operation is executed for the P-ECU 26 per se by the user operation. Meanwhile, when it is determined that the P-ECU 26 continuously remains under the wake state, the initial-operation execution presence/absence determining means 102 determines that no initial operation is executed for the P-ECU 26 per se by the user operation.

The user-operation presence/absence determining means 100 determines that the user operation is executed to place the P-ECU 26 in the running state including the wake state. In such a case, an initial-control power-supply turn-on determining section, i.e., initial-control power-supply turn-on determining means 104 determines if the running state is actually established by the user operation, i.e., if the vehicle power supply is turned on to activate the function related to the initial control including the initial drive control and the wall position detecting control of the P-lock drive motor 54. For instance, the initial-control power-supply turn-on determining means 104 determines if the vehicle power supply is switched from the TURN-OFF state to the TURN-ON state.

When the initial operation of the P-ECU 26 per se is executed upon the vehicle power supply switched from the TURN-OFF state to the TURN-ON state, an initial control section i.e. initial control means 106, executes the initial controls which are indicated by for instance the "State C" and the "State D" in FIG. 9, and which include the initial drive control for performing excitation-matching (phase-matching) of the P-lock drive motor 54, and the wall position detecting control for detecting the P wall position and the non-P wall position of the P-lock drive motor 54 to determine the reference position thereof. Even when the initial-operation execution presence/absence determining means 102 determines no execution of the initial operation for the P-ECU 26 per se by the user operation, there is a case where the initial-control power-supply turn-on determining means 104 determines that the vehicle power supply is turned on to activate the function related to the initial controls of the P-lock drive motor 54. In such a case, the initial control means 106 executes the initial controls such as the initial drive control and the wall position detecting control of the P-lock drive motor 54.

FIG. 14 is a flow chart illustrating a major part of control operations to be executed by the electronic control section 20, i.e., a series of control operations to be executed for reliably detecting (setting) the reference position to control the P-lock drive motor 54, and properly performing the switching between the P range and the non-P rage of the transmission 40 via the P-lock drive motor 54. Such a sequence is repeatedly executed on an extremely short cycle time in the order of for instance several milliseconds or several tens milliseconds.

First, at step (hereinafter the term "step" will be omitted) S10 corresponding to the user-operation presence/absence determining means 100, determination is made whether the user operation is executed to place for instance the P-ECU 26 in the running state involving the wake state. More particularly, determination is made if the vehicle power switch 80 is depressed in response to the power switch signal to switch the vehicle power supply from the TURN-OFF state to the TURN-ON state, and if the operations to activate only the antitheft function with placing the P-ECU 26 in the wake state including the operation to open the door of the vehicle, the operation to take the key out of the key slot and the operation to insert the key into the key slot, are executed. If the answer to S10 is negative, then, the current routine is terminated. If the answer to S10 is positive, then, at S20 corresponding to the initial-operation execution presence/absence determining means 102, determination is made whether the initial operation is executed for the P-ECU 26 per se by the user operation determined at for instance S10 mentioned above. That is, determination is made whether the P-ECU 26 is switched from the sleep state to the wake state by the user operation determined at for instance S10 mentioned above.

Here, a situation under which the P-ECU 26 is switched from the sleep state to the wake state by the user operation may include a case in which the vehicle power switch 80 is depressedly operated to switch the vehicle power supply to the TURN-ON state, when the P-ECU 26 is remained under the sleep state with the vehicle power supply remained under for instance the TURN-OFF state. Further, another situation is considered in which the P-ECU 26 is not switched from the sleep state to the wake state, in spite of the user operation being executed for switching the P-ECU 26 to the wake state, that is, the P-ECU 26 is continuously remained under the wake state. For example, when the P-ECU 26 remains under the running state with for instance the vehicle power supply kept in the TURN-ON state, the vehicle power switch 80 is depressedly operated to switch the vehicle power supply to the TURN-OFF state for switching the P-ECU 26 to the wake state to activate the antitheft function. Under such situation the vehicle power switch 80 is depressedly operated to switch the vehicle power supply to the TURN-ON state, the operation is executed to open the door of the vehicle; and a foot brake is depressed, etc.

If the answer to S20 is positive, then, at S50 corresponding to the initial control means 106, the initial controls are executed when the user operation executing the initial operation of the P-ECU 26 per se belongs to the operation of depressing the vehicle power switch 80. Such initial controls include, as indicated by for instance the "State C" and the "State D" in FIG. 9, the initial drive control for performing excitation-matching (phase-matching) of the P-lock drive motor 54, and the wall position detecting control of the P-lock drive motor 54 for detecting the P wall position and the non-P wall position thereof to set the reference position, etc.

Meanwhile, if the answer to S20 is negative, then, at S30 corresponding to the initial-control power-supply turn-on determining means 104, determination is made based on whether the vehicle power supply is switched from for instance the TURN-OFF state to the TURN-ON state. That is, the determination is made if the P-ECU 26 is actually placed in the running state by the user operation determined at S10, i.e., if the vehicle power supply is turned on to activate the function related to the initial controls including the initial drive control and the wall position detecting control of the P-lock drive motor 54. More particularly, the answer to S30 is made positive when the user operation determined at S10 belongs to the operation depressing the vehicle power switch 80 and the vehicle power supply is switched from the TURN-OFF state to the TURN-ON state. On the contrary, the answer to S30 is made negative when the user operation determined at S10 belongs to the operation of opening the door of the vehicle and the operation of depressing the foot brake and when the vehicle power supply is not switched from the TURN-OFF state to the TURN-ON state.

If the answer to S30 is positive, then, at S50 corresponding to the initial control means 106, the operations are executed to perform the initial controls including the initial drive control (motor-phase matching-control) and the wall position detecting control of the P-lock drive motor 54. In contrast, if the answer to S30 is negative, then, at S40 corresponding to the initial control means 106, any of the initial controls such as the initial drive control and the wall position detecting control of the P-lock drive motor 54 are not executed, a current vehicle state being sustained.

As set forth above, in accordance with the present embodiment, after the first operating state (running state of the P-ECU 26, and TURN-ON state of the vehicle power supply) enabling a detection of a reference position for controlling the P-lock drive motor 54 during an initial operation of the P-lock drive motor 54 is switched to the second operating state (halt state of the P-ECU 26, and TURN-OFF state of the vehicle power supply) disabling the detection of the reference position, when the second operating state is switched to the first operating state with the third operating state (wake state of the P-ECU 26) being continuously remained with an inability to detect the reference position but with an ability to detect vehicle information, the reference position is detected again. This allows the reference position to be reliably detected for controlling the P-lock drive motor 54, which can properly switch the transmission 40 between the P range and the non-P range via the P-lock drive motor 54. For instance, even if the P-ECU 26 continuously remains under the wake state when the vehicle power supply is switched from the TURN-OFF state to the TURN-ON state, the P-lock drive motor 54 can execute the initial controls thereof. Thus, the reference position, reset to the initial state once, is detected again during the initial operations of the P-lock drive motor 54.

In accordance with the present embodiment, moreover, when the second operating state (halt state of the P-ECU 26, and TURN-OFF state of the vehicle power) is switched to the first operating state (running state of the P-ECU 26, and TURN-ON state of the vehicle power supply), the first operating state is established after establishment of the third operating state (wake state of the P-ECU 26). Accordingly, the reference position can be appropriately detected for controlling the P-lock drive motor 54 under the first operating state. For instance, the first operating state is established after the initial operations (initial processing) of the P-ECU 26 have been executed under the third operating state.

In accordance with the present embodiment, moreover, establishment of the second operating state corresponds to the TURN-OFF of the vehicle power supply, and establishment of the first operating state corresponds to the TURN-ON of the vehicle power supply. Accordingly, when the vehicle power supply is switched from the TURN-OFF state to the TURN-ON state, the reference position, reset to the initial state once, is detected again during the initial operations of the P-lock drive motor 54.

In accordance with the present embodiment, further, the parking range and the non-parking range of the transmission 40 for switchably activating and canceling the parking lock in response to the driver operation are switched under electrical control by actuating the P-lock drive motor 54. In addition, under the wake state of the P-ECU 26, the antitheft function is activated disabling the transmission 40 from being switched to the non-parking range for switchably canceling the parking lock independent of the driver operation. Further, the wake state of the P-ECU 26 can be established in spite of a state of the vehicle power supply. Accordingly, when the second operating state (halt state of the P-ECU 26, and TURN-OFF state of the vehicle power) is switched to the first operating state (running state of the P-ECU 26, and TURN-ON of the vehicle power supply) with the antitheft function being activated, the reference position for controlling the P-lock drive motor 54 is detected during the initial operations of the P-lock drive motor 54.

In accordance with the present embodiment, furthermore, the encoder count depending on a displacement of the P-lock drive motor 54 is acquired, and the P-lock drive motor 54 is controlled such that the acquired encoder count matches the predetermined target encoder count. In addition, the P-lock drive motor 54 can be restricted from moving in the predetermined direction under the predetermined shift range. Further, under the first operating state (running state of the P-ECU 26, and TURN-ON of the vehicle power supply), when the P-lock drive motor 54 is moved in the direction where movement of the P-lock drive motor 54 is restricted, the reference position of the P-lock drive motor 54 associated with the predetermined shift range is detected based on the acquired encoder count. Accordingly, the reference position for controlling the P-lock drive motor 54 can be appropriately detected.

While the present invention has been described above with reference to the embodiment shown in the drawings, the present invention can be applied in other modes.

In the illustrated embodiment, for instance, the electronic control section 20 incorporates the plural ECUs such as the PM-ECU 22, the HV-ECU 24 and the P-ECU 26, etc., for realizing the shifting-by-wire function. However, the present invention is not limited to such a structure and various structures may be applied. For instance, the HV-ECU 24 and the P-ECU 26 may be configured of a single ECU having those functions.

In the illustrated embodiment, further, although the shifting lever 32 is of the type that can be switched in operation on a two-dimensional basis, the shifting lever 32 may be of one type that can be switched in operation along one axis, or the other type that can be switched in operation on a three-dimensional basis.

In the illustrated embodiment, furthermore, although the shifting sensor 36 and the select sensor 38 are employed as the position sensors for detecting the position of the shifting lever 32, the number of position sensors is not limited to two.

Moreover, although the shifting lever 32 of the present embodiment described above includes the momentary type lever switch that can be operatively switched to a plurality of shifting positions $P_{SH}$, such a structure may be replaced by for instance a push-button type switch or a slide type switch or the like. In addition, the shifting operation device 30 may not be manually operated but may be operated on a foot. In another alternative, the shifting operation may be executed in response to a voice of a driver. Moreover, the shifting operation device 30 is configured in structure to be separate from the P switch 34, the shifting operation device 30 may take the form of a structure that further has a parking position to provide the same function as that of the P switch 34. In addition, the shifting operation device 30 and the P switch 34 may not be of the momentary types. Such an alternative enables the application of the present invention.

It is intended that the present invention described be considered only as illustrative of one embodiment and that the present invention may be implemented in various modifications and improvements based on knowledge of those skilled in the art.

The invention claimed is:
1. A shift control system for a vehicle, including a transmission, a shift control device, and an actuator to switch shift ranges of the transmission, the shift control device controlling the actuator and switching establishment of operating states between a first operating state enabling a detection of a ref- erence position for controlling the actuator during an initial operation of the actuator, and a second operating state disabling the detection of the reference position, the shift control device comprising:

an electronic control section establishing, besides the first and second operating states, a third operating state with an inability to detect the reference position but with an ability to detect vehicle information; and when the second operating state is switched to the first operating state with the third operating state continuously remained, after switching from the first operating state to the second operating state, the electronic control section detecting the reference position again.

2. The shift control device for vehicle according to claim 1, wherein when the second operating state is switched to the first operating state, the electronic control section establishes the first operating state after establishment of the third operating state.

3. The shift control device for vehicle according to claim 1, wherein establishment of the second operating state corresponds to a turn-off of a vehicle power supply, and establishment of the first operating state corresponds to a turn-on of the vehicle power supply.

4. The shift control device for vehicle according to claim 2, wherein establishment of the second operating state corresponds to a turn-off of a vehicle power supply, and establishment of the first operating state corresponds to a turn-on of the vehicle power supply.

5. The shift control device for vehicle according to claim 1, wherein:
the electronic control section switches a parking range and a non-parking range of the transmission for switchably activating and canceling a parking lock in response to a driver operation under electrical control by actuating the actuator;
under the third operating state, the electronic control section activates an antitheft function disabling the transmission from being switched to the non-parking range for switchably canceling the parking lock in response to the driver operation; and
the electronic control section establishes the third operating state in spite of a state of the vehicle power supply.

6. The shift control device for vehicle according to claim 2, wherein:
the electronic control section switches a parking range and a non-parking range of the transmission for switchably activating and canceling a parking lock in response to a driver operation under electrical control by actuating the actuator;
under the third operating state, the electronic control section activates an antitheft function disabling the transmission from being switched to the non-parking range for switchably canceling the parking lock in response to the driver operation; and
the electronic control section establishes the third operating state in spite of a state of the vehicle power supply.

7. The shift control device for vehicle according to claim 3, wherein:
the electronic control section switches a parking range and a non-parking range of the transmission for switchably activating and canceling a parking lock in response to a driver operation under electrical control by actuating the actuator;
under the third operating state, the electronic control section activates an antitheft function disabling the transmission from being switched to the non-parking range for switchably canceling the parking lock in response to the driver operation; and
the electronic control section establishes the third operating state in spite of a state of the vehicle power supply.

8. The shift control device for vehicle according to claim 4, wherein:
the electronic control section switches a parking range and a non-parking range of the transmission for switchably activating and canceling a parking lock in response to a driver operation under electrical control by actuating the actuator;
under the third operating state, the electronic control section activates an antitheft function disabling the transmission from being switched to the non-parking range for switchably canceling the parking lock in response to the driver operation; and
the electronic control section establishes the third operating state in spite of a state of the vehicle power supply.

9. The shift control device for vehicle according to claim 1, wherein:
the electronic control section acquires a count value depending on a displacement of the actuator, and controls the actuator such that the acquired count value matches a preset target count value;
the shift control device further comprises a restricting member restricting the actuator from moving in a predetermined direction under a predetermined shift range; and
under the first operating state, when the actuator is moved in the direction where movement of the actuator is restricted, the electronic control section detects the reference position of the actuator associated with the predetermined shift range based on the acquired count value.

10. The shift control device for vehicle according to claim 2, wherein:
the electronic control section acquires a count value depending on a displacement of the actuator, and controls the actuator such that the acquired count value matches a preset target count value;
the shift control device further comprises a restricting member restricting the actuator from moving in a predetermined direction under a predetermined shift range; and
under the first operating state, when the actuator is moved in the direction where movement of the actuator is restricted, the electronic control section detects the reference position of the actuator associated with the predetermined shift range based on the acquired count value.

11. The shift control device for vehicle according to claim 3, wherein:
the electronic control section acquires a count value depending on a displacement of the actuator, and controls the actuator such that the acquired count value matches a preset target count value;
the shift control device further comprises a restricting member restricting the actuator from moving in a predetermined direction under a predetermined shift range; and
under the first operating state, when the actuator is moved in the direction where movement of the actuator is restricted, the electronic control section detects the reference position of the actuator associated with the predetermined shift range based on the acquired count value.

12. The shift control device for vehicle according to claim 4, wherein:
- the electronic control section acquires a count value depending on a displacement of the actuator, and controls the actuator such that the acquired count value matches a preset target count value;
- the shift control device further comprises a restricting member restricting the actuator from moving in a predetermined direction under a predetermined shift range; and
- under the first operating state, when the actuator is moved in the direction where movement of the actuator is restricted, the electronic control section detects the reference position of the actuator associated with the predetermined shift range based on the acquired count value.

13. The shift control device for vehicle according to claim 5, wherein:
- the electronic control section acquires a count value depending on a displacement of the actuator, and controls the actuator such that the acquired count value matches a preset target count value;
- the shift control device further comprises a restricting member restricting the actuator from moving in a predetermined direction under a predetermined shift range; and
- under the first operating state, when the actuator is moved in the direction where movement of the actuator is restricted, the electronic control section detects the reference position of the actuator associated with the predetermined shift range based on the acquired count value.

14. The shift control device for vehicle according to claim 6, wherein:
- the electronic control section acquires a count value depending on a displacement of the actuator, and controls the actuator such that the acquired count value matches a preset target count value;
- the shift control device further comprises a restricting member restricting the actuator from moving in a predetermined direction under a predetermined shift range; and
- under the first operating state, when the actuator is moved in the direction where movement of the actuator is restricted, the electronic control section detects the reference position of the actuator associated with the predetermined shift range based on the acquired count value.

15. The shift control device for vehicle according to claim 7, wherein:
- the electronic control section acquires a count value depending on a displacement of the actuator, and controls the actuator such that the acquired count value matches a preset target count value;
- the shift control device further comprises a restricting member restricting the actuator from moving in a predetermined direction under a predetermined shift range; and
- under the first operating state, when the actuator is moved in the direction where movement of the actuator is restricted, the electronic control section detects the reference position of the actuator associated with the predetermined shift range based on the acquired count value.

16. The shift control device for vehicle according to claim 8, wherein:
- the electronic control section acquires a count value depending on a displacement of the actuator, and controls the actuator such that the acquired count value matches a preset target count value;
- the shift control device further comprises a restricting member restricting the actuator from moving in a predetermined direction under a predetermined shift range; and
- under the first operating state, when the actuator is moved in the direction where movement of the actuator is restricted, the electronic control section detects the reference position of the actuator associated with the predetermined shift range based on the acquired count value.

\* \* \* \* \*